US012223218B2

United States Patent
Vigna et al.

(10) Patent No.: US 12,223,218 B2
(45) Date of Patent: *Feb. 11, 2025

(54) SYSTEM AND METHOD TO INCREASE DISPLAY AREA UTILIZING A PLURALITY OF DISCRETE DISPLAYS

(71) Applicants: STMICROELECTRONICS, INC., Coppell, TX (US); STMICROELECTRONICS INTERNATIONAL N.V., Schiphol (NL)

(72) Inventors: Benedetto Vigna, Geneva (CH); Mahesh Chowdhary, San Jose, CA (US); Matteo Dameno, Novara (IT)

(73) Assignees: STMICROELECTRONICS, INC., Coppell, TX (US); STMICROELECTRONICS INTERNATIONAL N.V., Schiphol (NL)

(*) Notice: Subject to any disclaimer, the term of this patent is extended or adjusted under 35 U.S.C. 154(b) by 0 days.

This patent is subject to a terminal disclaimer.

(21) Appl. No.: 18/063,028

(22) Filed: Dec. 7, 2022

(65) Prior Publication Data

US 2023/0106370 A1 Apr. 6, 2023

Related U.S. Application Data

(63) Continuation of application No. 17/380,754, filed on Jul. 20, 2021, now Pat. No. 11,550,531, which is a
(Continued)

(51) Int. Cl.
*G06F 3/14* (2006.01)
*G01P 1/07* (2006.01)
*G06F 3/12* (2006.01)

(52) U.S. Cl.
CPC .............. *G06F 3/1243* (2013.01); *G01P 1/07* (2013.01); *G06F 3/1446* (2013.01);
(Continued)

(58) Field of Classification Search
CPC ........ G06F 3/1423; G06F 3/1446; G01P 1/07; G09G 2340/0492; G09G 2356/00;
(Continued)

(56) References Cited

U.S. PATENT DOCUMENTS 6,331,840 B1 * 12/2001 Nielson ................. G06F 3/1438
715/764
7,068,294 B2 * 6/2006 Kidney ................. G06F 3/0481
715/761
(Continued)

FOREIGN PATENT DOCUMENTS

CN 101620846 A 1/2010
CN 102725726 A 10/2012
(Continued)

*Primary Examiner* — Jose R Soto Lopez
(74) *Attorney, Agent, or Firm* — Seed IP Law Group LLP

(57) ABSTRACT

A method includes receiving, at a master agent, announcements from candidate consumer agents indicating the presence of the candidate consumer agents. Each announcement includes display parameters for a display of the corresponding candidate consumer agent. The method further includes receiving at the master agent content parameters from a producer agent, the content parameters defining characteristics of content to be provided by the consumer agent. A mosaic screen is configured based on the received announcements and the content parameters. This configuring of the mosaic screen includes selecting ones of the consumer agents for which an announcement was received and generating content distribution parameters based on the content parameters and the display parameters of the selected ones
(Continued)

of the consumer agents. The generated content distribution parameters are provided to the consumer agent.

17 Claims, 10 Drawing Sheets

Related U.S. Application Data continuation of application No. 16/045,269, filed on Jul. 25, 2018, now Pat. No. 11,093,197.

(60) Provisional application No. 62/538,988, filed on Jul. 31, 2017.

(52) U.S. Cl.
CPC . *G09G 2340/0492* (2013.01); *G09G 2356/00* (2013.01); *G09G 2370/042* (2013.01); *G09G 2370/047* (2013.01)

(58) Field of Classification Search
CPC ...... G09G 2370/042; G09G 2370/047; H04M 1/72412; H04M 1/72454
See application file for complete search history.

(56) References Cited

U.S. PATENT DOCUMENTS

| | | | |
|---|---|---|---|
| 7,525,511 B2* | 4/2009 | Baudisch | G06F 3/1446 345/1.3 |
| 8,482,480 B2 | 7/2013 | Kim et al. | |
| 8,508,433 B2* | 8/2013 | Manning | G06F 1/1677 345/1.3 |
| 8,599,106 B2* | 12/2013 | Gimpl | G06F 3/04847 345/169 |
| 8,749,484 B2* | 6/2014 | De Paz | G06F 1/1647 345/169 |
| 8,762,863 B2* | 6/2014 | Nomura | G06F 3/0488 345/1.3 |
| 9,001,149 B2* | 4/2015 | Sirpal | G06F 1/1647 345/619 |
| 9,086,837 B1* | 7/2015 | Kang | G06F 3/016 |
| 9,190,017 B2* | 11/2015 | Matel | G06F 3/1423 |
| 9,298,362 B2* | 3/2016 | Lucero | H04N 21/4126 |
| 9,417,835 B2* | 8/2016 | Tait | G06F 3/1446 |
| 9,460,643 B2* | 10/2016 | Hirakata | H05K 5/0086 |
| 9,495,020 B2* | 11/2016 | Itaya | G06F 3/04883 |
| 9,529,518 B2* | 12/2016 | Kohashi | G06F 3/0486 |
| 9,557,832 B2* | 1/2017 | Chen | G06F 3/03543 |
| 9,565,366 B2* | 2/2017 | Yamazaki | G06F 1/1652 |
| 9,692,869 B2* | 6/2017 | Gai | H04M 1/72412 |
| 9,696,899 B2* | 7/2017 | Kim | G06F 1/1616 |
| 9,727,298 B2* | 8/2017 | Naruse | G06F 3/1423 |
| 9,736,291 B2* | 8/2017 | Gai | H04W 12/50 |
| 9,823,890 B1* | 11/2017 | Lewbel | G06F 3/1446 |
| 9,880,799 B1* | 1/2018 | Bertz | G06F 3/1446 |
| 9,966,043 B2* | 5/2018 | Kaneko | G09G 5/12 |
| 10,019,219 B2* | 7/2018 | Yoon | G09G 5/395 |
| 10,037,183 B2* | 7/2018 | Han | G06F 3/0488 |
| 10,061,552 B2* | 8/2018 | DeLuca | G09G 5/003 |
| 10,078,485 B2* | 9/2018 | Akatsuka | G09G 5/006 |
| 10,133,533 B1* | 11/2018 | Sharifi | G06F 3/033 |
| 10,156,969 B2* | 12/2018 | Sirpal | G06F 1/1647 |
| 10,157,032 B2* | 12/2018 | Neisler | G06F 3/1446 |
| D839,232 S * | 1/2019 | Itou | D14/248 |
| 10,198,044 B2* | 2/2019 | Lyles | G06F 1/1616 |
| 10,203,925 B2* | 2/2019 | Nonaka | A63F 13/2145 |
| 10,234,902 B2* | 3/2019 | Delaporte | G06F 1/1679 |
| 10,235,120 B2* | 3/2019 | Cho | G06F 3/1446 |
| 10,289,258 B2* | 5/2019 | Lee | G06F 3/048 |
| 10,303,412 B2* | 5/2019 | Hong | H04M 1/724 |
| 11,093,197 B2* | 8/2021 | Vigna | G01P 1/07 |
| 2005/0117121 A1* | 6/2005 | Meerleer | H04N 21/4122 353/30 |
| 2005/0168399 A1* | 8/2005 | Palmquist | G06F 1/1601 345/1.1 |
| 2006/0033712 A1* | 2/2006 | Baudisch | G06F 3/1446 345/157 |
| 2006/0282855 A1 | 12/2006 | Margulis | |
| 2007/0070046 A1 | 3/2007 | Sheynblat et al. | |
| 2008/0079658 A1* | 4/2008 | Naito | G06F 3/1454 345/2.2 |
| 2008/0216125 A1* | 9/2008 | Li | G06F 3/1446 375/E7.076 |
| 2008/0304361 A1* | 12/2008 | Peng | G01S 15/74 367/127 |
| 2010/0053164 A1* | 3/2010 | Imai | G06F 3/147 345/1.3 |
| 2010/0064244 A1* | 3/2010 | Kilpatrick | H04M 1/0243 345/1.3 |
| 2010/0144283 A1* | 6/2010 | Curcio | H04W 4/02 455/66.1 |
| 2010/0328447 A1 | 12/2010 | Watson | |
| 2011/0109526 A1 | 5/2011 | Bauza et al. | |
| 2011/0252317 A1* | 10/2011 | Keranen | G06F 1/1698 715/702 |
| 2012/0050314 A1* | 3/2012 | Wang | G06F 3/1446 345/619 |
| 2012/0062442 A1* | 3/2012 | Locker | G06F 3/1446 345/1.3 |
| 2012/0088548 A1* | 4/2012 | Yun | G08C 23/04 455/557 |
| 2012/0320031 A1* | 12/2012 | Fujiwaka | G06F 3/048 345/418 |
| 2012/0326947 A1* | 12/2012 | Fujiwaka | G06F 3/1423 345/1.3 |
| 2013/0093659 A1* | 4/2013 | Nomura | G06F 3/013 345/156 |
| 2013/0176255 A1* | 7/2013 | Kim | G06F 3/04883 345/173 |
| 2013/0214995 A1* | 8/2013 | Lewin | G06F 3/0484 345/1.3 |
| 2013/0229325 A1* | 9/2013 | Yu | G09G 5/12 345/2.3 |
| 2013/0229340 A1* | 9/2013 | Yu | G06F 3/14 345/156 |
| 2013/0246576 A1* | 9/2013 | Wogsberg | H04N 21/2343 709/219 |
| 2013/0265487 A1* | 10/2013 | Yu | G06F 3/1446 348/383 |
| 2013/0297604 A1* | 11/2013 | Sutedja | G06Q 10/107 707/E17.089 |
| 2013/0300885 A1* | 11/2013 | Huang | H04N 1/3876 348/E5.045 |
| 2014/0095600 A1 | 4/2014 | Needham | |
| 2014/0098188 A1 | 4/2014 | Kwak et al. | |
| 2014/0104139 A1* | 4/2014 | Buchner | G06F 3/147 345/1.3 |
| 2014/0125697 A1* | 5/2014 | Suito | G06T 11/60 345/629 |
| 2014/0194066 A1* | 7/2014 | Li | G06F 3/1446 455/566 |
| 2014/0218266 A1* | 8/2014 | Chen | G06F 3/048 345/1.3 |
| 2014/0253417 A1* | 9/2014 | Brown | G06F 3/1446 345/2.3 |
| 2014/0306865 A1* | 10/2014 | Pan | G06F 3/1423 345/2.1 |
| 2015/0002371 A1* | 1/2015 | Burgess | G09G 5/12 345/1.2 |
| 2015/0077365 A1* | 3/2015 | Sasaki | G06F 3/1446 345/173 |
| 2015/0091917 A1* | 4/2015 | Li | G06F 3/1446 345/1.3 |
| 2015/0100658 A1* | 4/2015 | Lieberman | G06F 3/1454 709/208 |
| 2015/0116364 A1 | 4/2015 | Aurongzeb et al. | |
| 2015/0193187 A1* | 7/2015 | Kimn | G09G 5/006 345/1.2 |
| 2015/0254045 A1 | 9/2015 | Drake et al. | |

(56) References Cited

U.S. PATENT DOCUMENTS

| | | | |
|---|---|---|---|
| 2015/0317120 A1* | 11/2015 | Kim | G06F 1/1686 |
| | | | 345/1.3 |
| 2015/0355791 A1* | 12/2015 | Hidaka | G06F 3/1431 |
| | | | 715/761 |
| 2016/0266859 A1* | 9/2016 | Akatsuka | G06F 3/1446 |
| 2016/0266861 A1* | 9/2016 | Kim | H04N 9/3147 |
| 2016/0291919 A1* | 10/2016 | Kurota | H04N 9/3147 |
| 2016/0292820 A1* | 10/2016 | Kuan | G06F 3/1446 |
| 2016/0335040 A1* | 11/2016 | Wen | G06F 3/1446 |
| 2017/0012798 A1 | 1/2017 | Teramoto | |
| 2017/0124990 A1* | 5/2017 | Lee | G06F 3/147 |
| 2017/0134690 A1* | 5/2017 | Masumoto | G06F 3/1438 |
| 2017/0192733 A1* | 7/2017 | Huang | G06F 3/1446 |
| 2017/0255345 A1* | 9/2017 | Veeramani | H04N 21/00 |
| 2017/0257411 A1* | 9/2017 | Veeramani | H04L 65/613 |
| 2017/0285843 A1 | 10/2017 | Roberts-Hoffman et al. | |
| 2018/0004475 A1* | 1/2018 | Itakura | G09G 5/006 |
| 2018/0018941 A1* | 1/2018 | Monden | H04N 9/3179 |
| 2018/0061288 A1* | 3/2018 | Kubota | H04N 9/3188 |
| 2018/0299996 A1 | 10/2018 | Kugler et al. | |
| 2018/0357034 A1* | 12/2018 | Lee | G09G 5/14 |
| 2019/0018637 A1* | 1/2019 | Cheon | G06F 3/1446 |
| 2019/0026064 A1* | 1/2019 | Jeon | G09G 5/14 |
| 2019/0034147 A1 | 1/2019 | Koki et al. | |
| 2019/0196707 A1* | 6/2019 | Szeto | G06F 1/1626 |

FOREIGN PATENT DOCUMENTS

| | | |
|---|---|---|
| CN | 104144302 A | 11/2014 |
| CN | 104869662 A | 8/2015 |

* cited by examiner

SYSTEM AND METHOD TO INCREASE DISPLAY AREA UTILIZING A PLURALITY OF DISCRETE DISPLAYS

BACKGROUND

Technical Field

The present disclosure is directed to a system and method of integrating a plurality of discrete displays, such as multiple hand-held electronic devices to display an image or images across the plurality of displays, where each display presents a unique portion of the image.

Description of the Related Art

Hand-held electronic devices are everywhere. Most people have one or mobile or hand-held electronic devices each having different screen or display sizes. People have begun integrating these hand-held electronic devices into their everyday face-to-face interactions, such as sharing photos with friends and family or giving presentations in an office or business setting. Sometimes, a single screen or display is too small to fully appreciate the details of an image, document, or presentation.

BRIEF SUMMARY

The present disclosure is directed to a system and method that allows users of multiple discrete devices to position the devices adjacent to each other to create one larger display. A single image can be displayed across, for example, four adjacent devices to increase the size of the display on which the image is viewed. A video can be displayed across the multiple devices. This can enhance user experience when sharing static images or videos.

DETAILED DESCRIPTION

Figure 1:
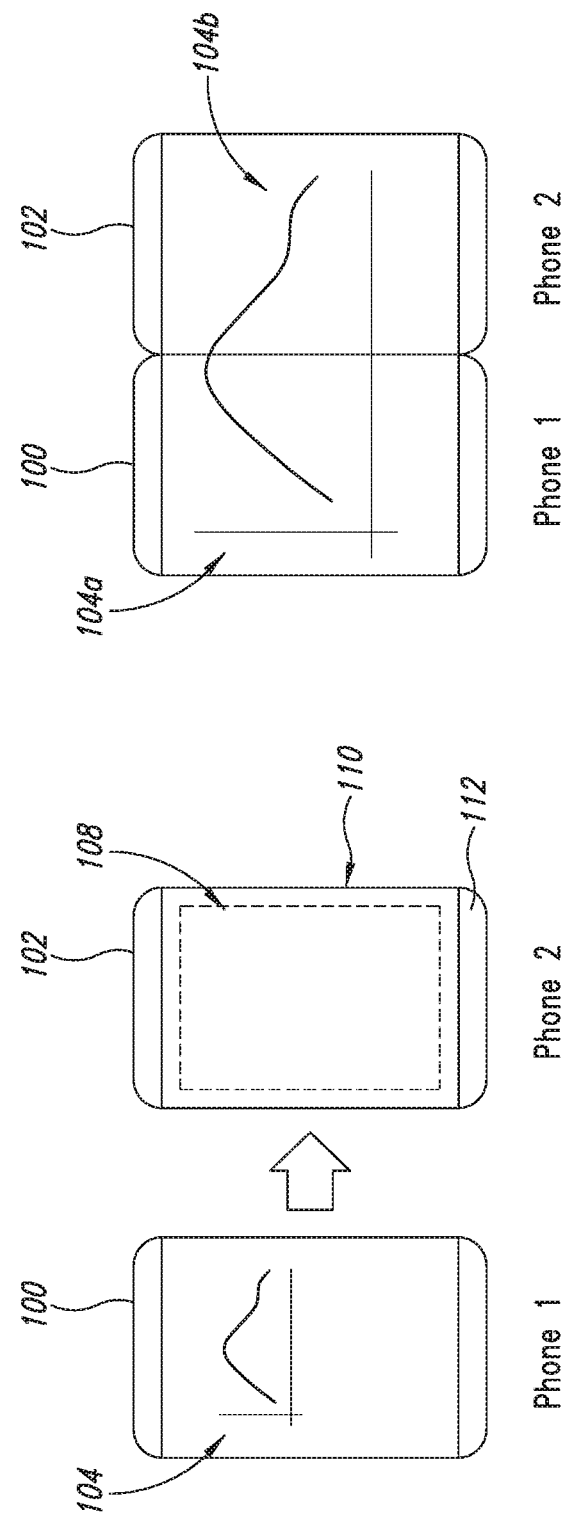
FIG. 1 are views of a first and second mobile electronic device in accordance with an embodiment of the present disclosure.

FIG. 1 includes a first mobile electronic device 100 and a second mobile electronic device 102. In standard mobile electronic devices, an image 104 is stored on one of the mobile devices 100, 102 and is displayable on only the one of the mobile devices storing the image, such that the image 104 is relatively small when displayed only on a screen of the one of the mobile devices storing the image. If two users are viewing the image together, it may be advantageous to view the image 104 in a larger format, such as on two screens. The present disclosure provides the user with such flexibility in viewing the image 104.

The present disclosure is also directed to displaying a single image or video across a plurality of displays that communicate with each other about orientation and screen resolution and determine how to divide and display the image or video across the plurality of displays. For example, the displays may be "smart monitors" or "smart screens" that each include orientation sensors, such as accelerometers or gyroscopes, and wireless communication circuitry to transmit and exchange the respective orientation and display properties.

The plurality of displays, whether multiple screens on adjacent cell phones or multiple monitors arranged on a wall, the image 104 can be displayed in several parts, such as, in FIG. 1, which illustrates a first part 104a on the first mobile electronic device 100 and a second part 104b on the second mobile electronic device 102. The term "mobile electronic device" as used herein means any type of portable electronic device that may be easily transported between different locations.

To start, mobile electronic devices may include cell phones, mobile phones, laptops with or without physical keyboards, tablet computers, or any electronic device with a display, such as a monitor or screen. Many current mobile electronic devices maximize display area by limiting the structural frame around edges of the mobile electronic device. For example, in FIG. 1, the mobile electronic devices 100, 102 have display areas 108 that extend to edges 110 of a frame 112. Such display areas can be referred to as bezel-less designs. Regardless of an amount of frame that exists at an edge of the mobile electronic device, the present disclosure provides for increasing a display area by utilizing multiple adjacent displays.

Figure 2:
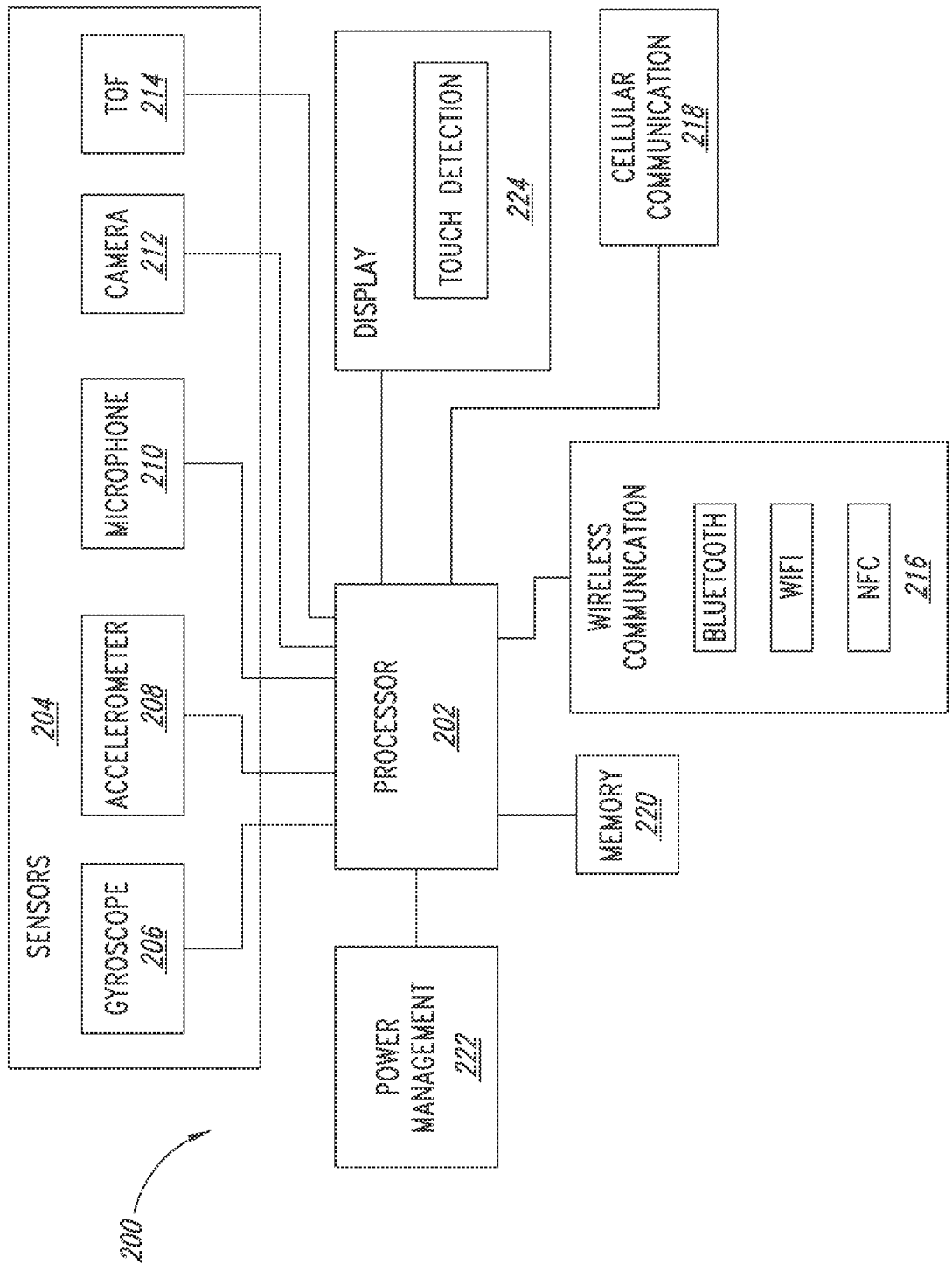
FIG. 2 is a block diagram of components included within a mobile electronic device in accordance with the present disclosure.

Each of the mobile electronic devices include a plurality of electronic chips or components that provide the functionality of the mobile electronic devices. For example, as illustrated in FIG. 2 an electronic device 200 includes a processor 202. This processor may be a single processor or include a plurality of processors, such as a central processing unit, a graphics processing unit, a microprocessor, or any other type of integrated circuit or application specific integrated circuit that alone or together provide the functionally of the electronic device.

The electronic device 200 also includes a plurality of sensors 204, which include one or more of a gyroscope 206, an accelerometer 208, a microphone 210, an image sensor 212 (such as a camera), and a time-of-flight (TOF) 214 (range detection sensor). Each of these sensors communicate with processor.

The electronic device 200 includes a wireless communication module 216 and a cellular communication module 218. Some wireless communication options include Bluetooth, WIFI, and near-field communication (NFC). The device 200 includes memory 220 and a power management module 222.

A display module 224 includes a touch screen or other screen that provides a user with visual interactive interface on which the user may view documents, images (still or video), and any other graphical user interface. The display may be capable or configured to receive inputs from a user's finger or a stylus.

The mobile devices includes suitable software, hardware, and firmware to operate the mobile electronic device. The software includes instructions and algorithms to receive data about the environment and inputs from the user by using the various sensors in the mobile device. Each mobile device may have an operating system embedded in the device that provides functionality to utilize applications (apps) that integrate with the sensors and other components within the mobile electronic device.

Figure 3A:
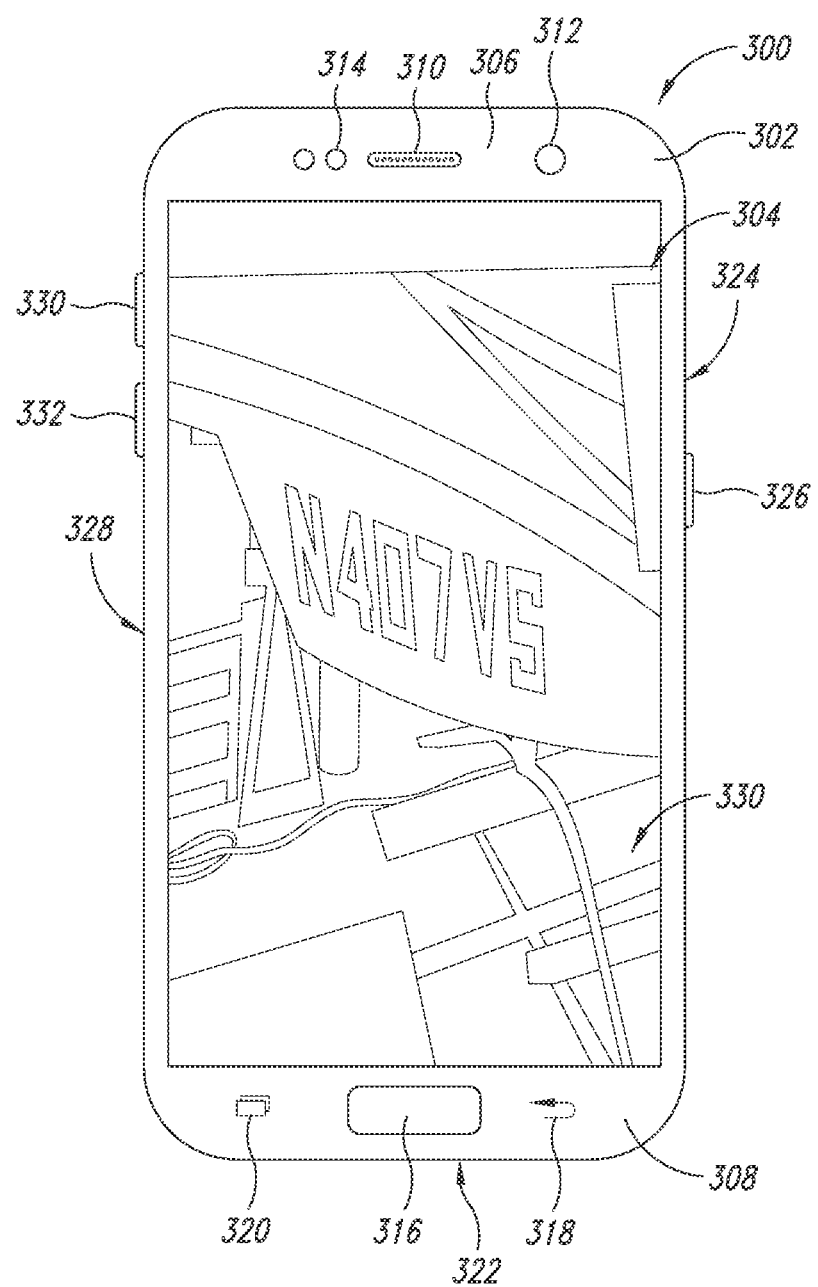
FIGS. 3A-3B are views of a first and second mobile electronic device in accordance with embodiments of the present disclosure.

FIG. 3A is an example of a first mobile phone 300 having a frame 302. A screen 304 is positioned within the frame 302 and is an interactive touch display screen, where a user can select or interact with the screen using their finger or a stylus. The frame has a first end 306 that is opposite to a second end 308. The first end 306 includes openings through the frame that expose portions of an internal printed circuit board housing the various electronic components, such as those described with respect to FIG. 2. A speaker 310 is centrally positioned on the first end 306. A camera or image sensor module 312 is positioned to one side of the speaker 310 and a time of flight sensor 314 is positioned to another side of the speaker 310.

The second end 308 includes a button 316 that may be a "home" button to return the display to a home interface or default interface. There are other interactive surfaces 318, 320 on the second end 308. A microphone 322 is positioned to receive sound through an exterior surface of the second end.

A first side 324 of the frame of the mobile phone 300 includes a button 326. A second side 328 of the frame includes two buttons, 330, 332, which may be volume control buttons. The first and second sides have a small amount of frame area as compared to a surface area of the first and second ends. An edge of these electronic devices can be referred to as bezels.

Figure 3B:
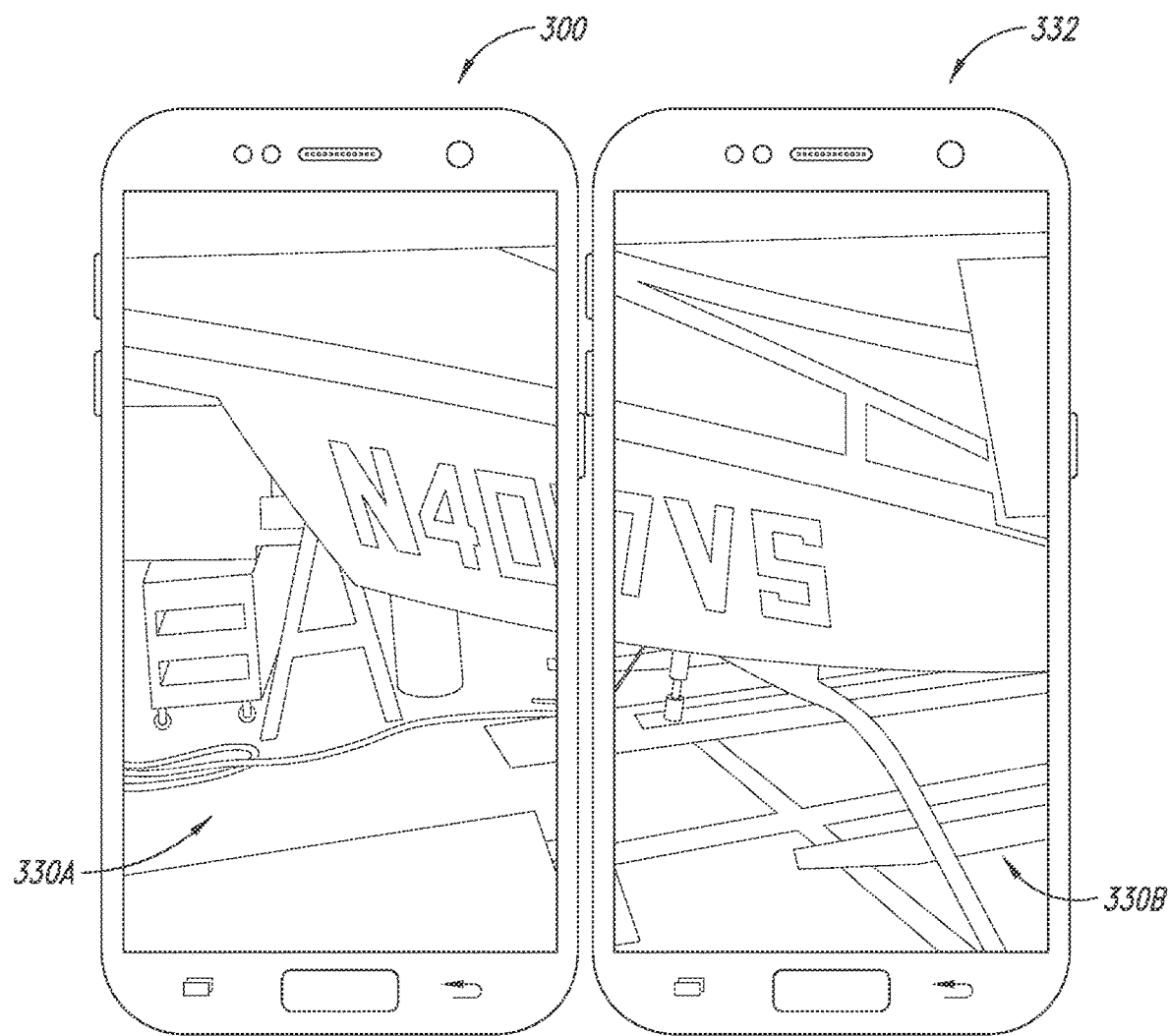

FIG. 3A is illustrated as having an image 330 of a portion of a tail of a helicopter with the call letters N407VS displayed on the tail. A user may elect to share this image with another user. FIG. 3B includes two phones, the first phone 300 from FIG. 3A and a second phone 332. The first and second phones in FIG. 3B are the same type of phones, i.e. made by the same manufacturer and having the same screen size and internal components. It is noted that the present disclosure can be implemented using phones of different screen sizes and different manufacturers, which will be described in more detail below.

In FIG. 3B, the image 329 from the first phone 300 in FIG. 3A is displayed in a first part 330A on the first phone 300 and in a second part 330B on the second phone 332. The screen or display size is doubled by using two adjacent phones. Methods for communicating this process between the two phones or between more than two phones are described in further detail below.

Figure 4:
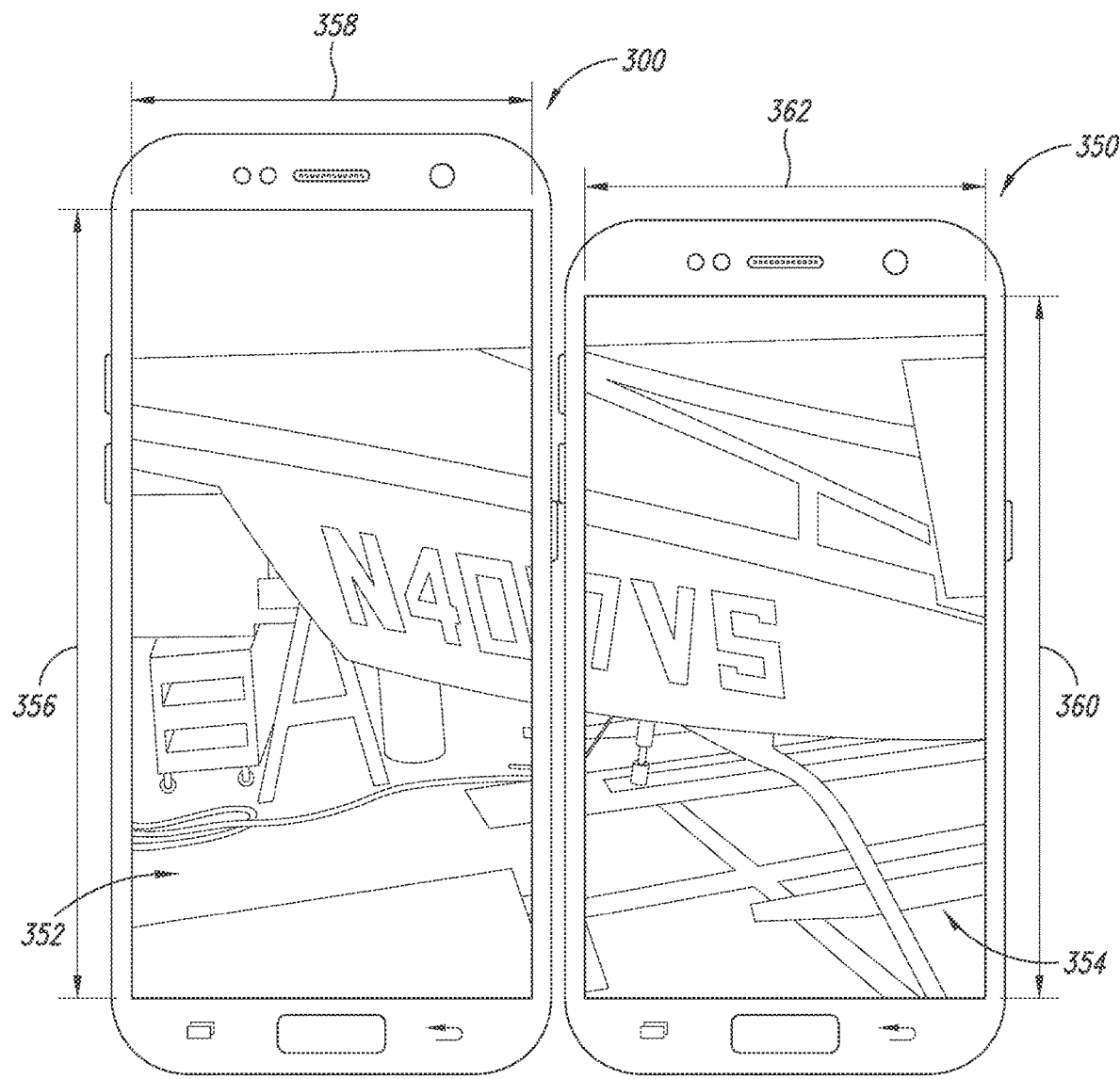
FIG. 4 is a first and second mobile electronic device of different sizes in accordance with embodiments of the present disclosure.

FIG. 4 has the first phone 300 from FIGS. 3A and 3B adjacent to a third phone 350, which has a different screen or display size as compared to the first phone 300. The methods and systems described in this disclosure allow the first phone and the third phone to communicate wirelessly about each of their respective display sizes and orientations. One of the phones is the initiating or controlling phone to display the image on the two or more screens. The initiating phone will ping or otherwise determine a number of phones within a threshold distance of the initiating phone. The initiating phone will then gather the orientation and screen size information from the phones that are within the threshold distance, along with other information from each phone within the threshold distance, such as the aspect ratio of the screen of the phone, a pixel density of the screen, and a pixel dimension indicating the horizontal and vertical dimensions of the screen expressed terms of pixels. The initiating phone then processes the image to determine the number of parts into which the image can be separated to display the image across the number of phones.

For example, in FIG. 4, the first phone 300 may be the initiating phone, with the user instruction to display image 329 from FIG. 3A on more than one phone. The first phone 300 identifies that the third phone 350 is within a threshold distance or range of the first phone. The third phone 350 transmits the display size and orientation information to the first phone. The display size information will depend on the application and user instruction that is currently activated on the phone. The orientation information is gathered and output by the gyroscopes and accelerometers included in the third phone 350. This information may be communicated using Bluetooth, near field communication, or other wireless transmission techniques.

As the first phone gathers the information about the different operating parameters of the first and third phone, the first phone as the initiating phone determines that the screen size of the third phone is smaller than the screen size of the first phone. The processor or operating system of the first phone determines a first part 352 of the image 329 for display on the first phone and a second part 354 of the image 329 for display on the second phone 350. The initiating phone, in this case the first phone, then transmits the image information to the second phone. The information may be the portion of the image to be displayed or may be the whole image with information that will enable the third phone to process and display the correct portion of the image.

The first phone 300 adjusted a size of the first part 352 of the image so that a first dimension 356 and a second dimension 358 correspond to a first dimension 360 and a second dimension 362 of the third phone 350.

Figure 5:
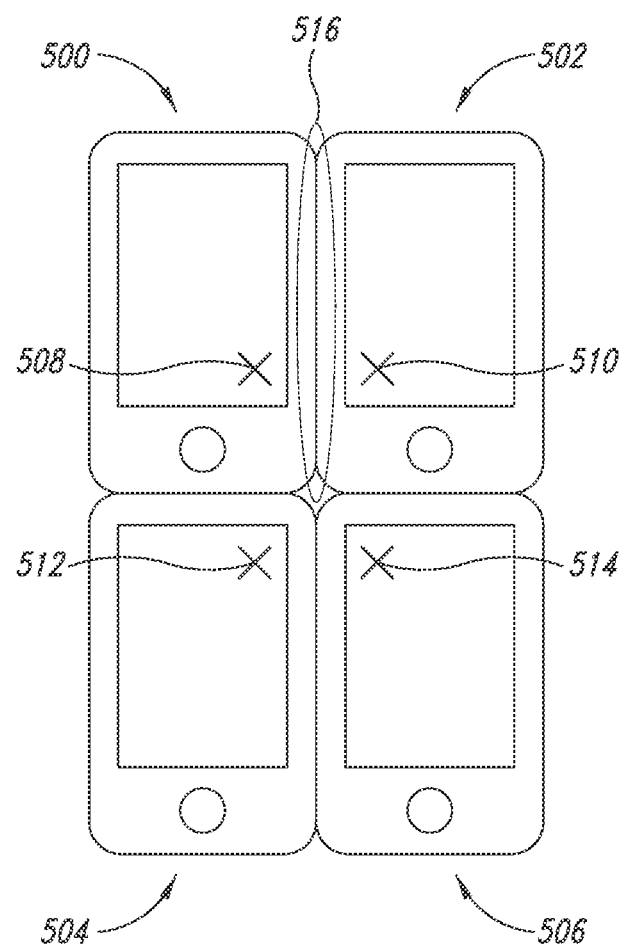
FIG. 5 is a plurality of electronic devices utilized in accordance with embodiments of the present disclosure.

FIG. 5 is an additional configuration of a plurality of devices that together can display a single image or video on the plurality of devices. The plurality of devices includes a first phone 500, a second phone 502, a third phone 504, and a fourth phone 506. The plurality of phones are arranged with the second phone 502 positioned on a right side of the first phone 500. The third phone 504 is positioned on a bottom side of the first phone 500. The fourth phone 506 is positioned on a bottom side of the second phone 502 and on a right side of the third phone 504. Other arrangements are envisioned and can include the plurality of devices aligned in a linear fashion, which may be beneficial to viewing a detailed panoramic photograph. In addition, instead of four phones, the plurality of devices may be a plurality of tablets or a mix of phones, tablets, and other electronic devices.

The arrangement of the plurality of devices is determined by the devices once in a shared display operating mode. The phones may automatically identify that they are close to or physically touching another display-enabled device. As such, the shared display operating mode may be enabled to automatically activate a shared display when a plurality of shared display parameters are met. Alternatively, the shared display operating mode may be a feature activated by the users, such as in an image viewing application or in a settings portion of the device.

The shared display parameters may include user activated shared screen settings or may be automatically activated, such as when two shared screen enabled devices are positioned close to one another. For example, each mobile electronic device, based on information gathered from the respective plurality of sensors, can determine if that mobile electronic device is positioned on a table as opposed to being held in a user's hand or in a user's pocket. If the mobile electronic device determines that the mobile electronic device is within a stability threshold, i.e., not in a pocket or bag, then a first shared display parameter is met. The stability threshold may include a movement range that include being held in a user's hand in a relatively stable position.

Enabled mobile electronic devices may periodically ping or poll surrounding devices to see if they are enabled for shared display settings. If two or more electronic devices determine that they are both close to each other, such as within an inch of each other, and are being held within the stability threshold, they can activate the shared image mode. This can include running an authentication protocol that can exchange orientation and display resolution information in preparation for displaying an image across multiple screens.

Once the devices are in the shared display operating mode, the devices are activated to detect a presence of another device having an enabled shared display operating mode. This mode can be considered a "screen combination mode."

In one embodiment, a position of each device is provided by the user. For example, on the first phone 500, a user can tap the lower right hand corner, such as on the X 508. For the second phone 502, the user taps the lower left hand corner of the screen, such as X 510. For the third phone 504, an upper right hand corner of the screen is touched, such as X 512. Similarly, for the fourth phone 506, an upper left hand corner of the screen is touched, such as X 514. This functionality can be provided by the touch screen sensors included in most modern smart phones, such that a general location of the touch can be identified, which can indicate orientation of the four phones.

Alternatively, an accelerometer of each of the phones can detect a tap on the screen or the frame of the respective phone. Accelerometers can determine a location of the tap from the user, such as an upper right corner as compared to a lower left corner.

Combinations of the accelerometer, gyroscope, microphone and other sensors can alternatively detect a phone to phone tap, i.e., instead of the user tapping a screen or portion of the frame to identify orientation of each phone with respect to each other, the phones can detect that they have been positioned adjacent to each other. Accelerometer and gyroscope algorithms processed in the processor or related application specific integrated circuits can determine that contact was made along a surface as opposed to the screen of the device.

For example, in FIG. 5, a boundary or interaction surface 516 between the first phone 500 and the second phone 502 can be identified by the respective accelerometer or gyroscope in each phone. In conjunction with the microphone, which can detect and determine differences between metal frames or cases being brought into contact with one another as compared to setting the phone down on a surface. For example, a detected tap along a left hand side of the second phone 502 in conjunction with a detection by the microphone of a metallic or case to case type sound reading can indicate to the phone that it is positioned adjacent to another phone. This indication in conjunction with the shared display operating mode will provide the phone with sufficient information to proceed with a next phase of analysis to proceed down the path to create a larger display with an adjacent phone.

The orientation and relative positon of each phone with respect to other phones to be utilized in the larger display will be communicated to at least the initiating phone. Alternatively, each of the phones can communicate with each other about their respective orientations. In addition, the phones will communicate the device parameters they each have, such as screen resolution, screen area, processor information, such as any relevant graphical processing and display parameters, and wireless communication protocol parameters.

Once an image is selected to be shared, the image is communicated from the initiating device to the other participating devices. The initiating device may collect all of the data from the other participating devices and may identify a section of the image to be displayed on each device. Alternatively, each of the devices can collect all of the data and locally determine which part of the image to display based on the parameters of each device.

Each electronic device has a graphical user interface framework and display drivers that all have operating parameters. Each will include a frame buffer that can be utilized if the shared image is video. The operating parameters will be communicated to the adjacent other devices to share the display. Each of the devices will have memory that stores or will access instructions that set authentication protocols for creating a larger display from a plurality of smaller displays.

As noted, the image may be a static image or may be a video. If video is selected, the initiating phone may be the only phone or device to output any sound. For video, the devices will communicate a frame rate so that each of the devices transitions from each image in the video at the appropriate rate to ensure the video is smoothly displayed across the various devices.

As each of the devices may be a different type of phone or tablet manufactured by a different entity, the operating systems can be different such that each device has a different platform and operating parameters. Once appropriate authentication is completed, such as confirming all adjacent devices are enabled for screen sharing mode, the platforms of the various devices exchange screen information such as size, orientation, relative position, and resolution. The dimensions and relatives positions are used to compute the bigger screen and determine which portions of the images will be displayed on which device. With the size, orientation, relative position, and resolution of each device, the dimension and resolution of the bigger, combined screen are computed.

The frame buffer of each device computes the related portion of the bigger screen on that device. This solution will provide improved user experience when using bigger display if the combination is achieved using individual bezelless (very little border around their screens) or reduced bezel devices.

In further embodiments of the present disclosure, the initiating device in the embodiments of FIGS. 1-5 communicates over a wireless network, such as a Wi-Fi network, to identify a number of devices with which the initiating device may communicate to display the image across the devices. Phones or other mobile electronic devices coupled to the wireless network are candidates for operation with the initiating device to display the image across the devices in these embodiments, regardless of the distance of the devices from the initiating device. The identified number of devices must, of course, at some point be brought physically proximate one another and the initiating device to display the image across all the devices.

Figure 6:
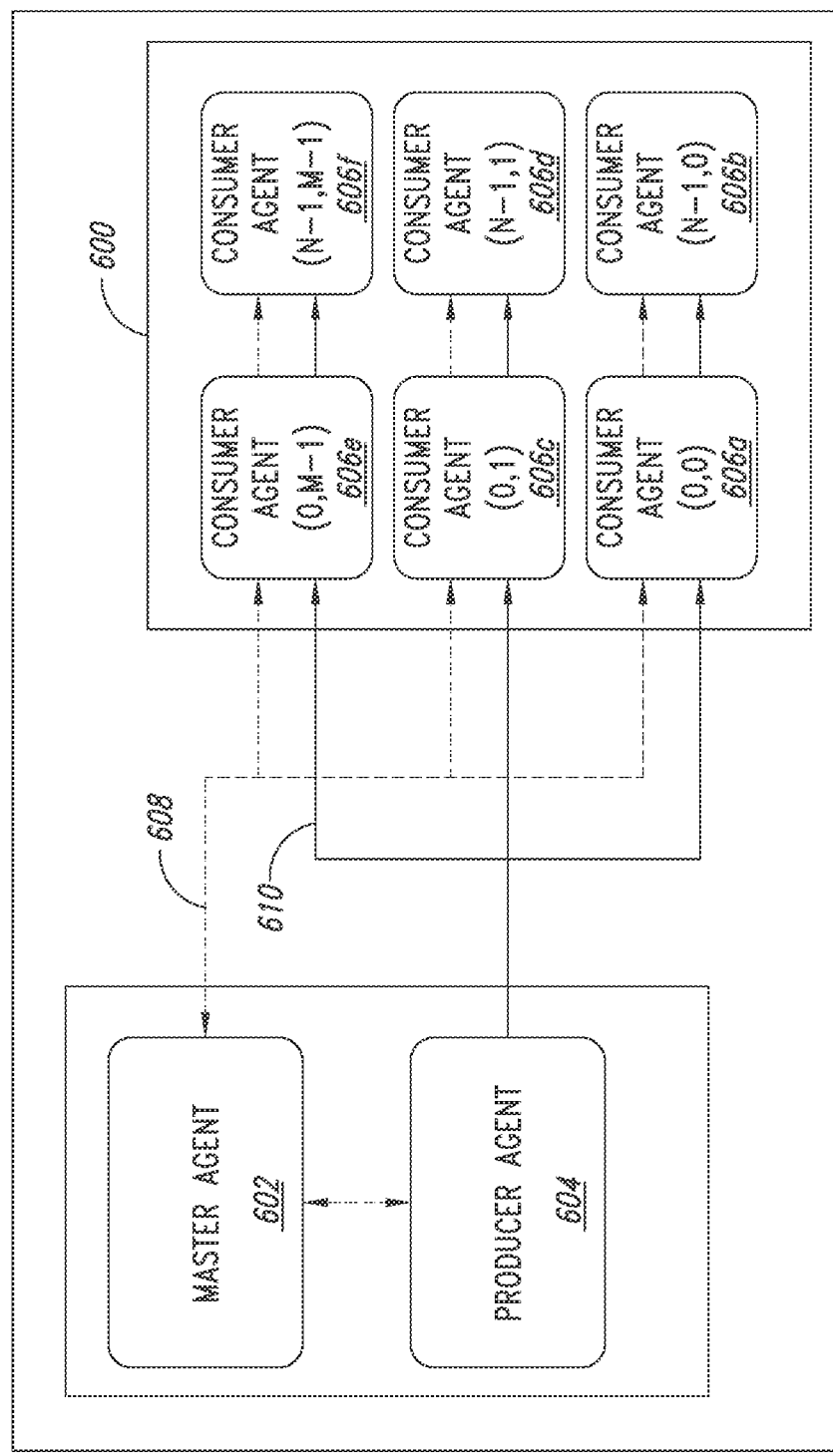
FIG. 6 is a functional block diagram illustrating a method of providing a mosaic screen formed by a plurality individual screens of mobile electronic devices according to one embodiment of the present disclosure.

FIG. 6 is a functional block diagram illustrating a method of providing a mosaic screen 600 formed by a plurality of individual screens of mobile electronic devices according to one embodiment of the present disclosure. In the embodiment of FIG. 6, a plurality of mobile electronic devices implements the method, with each of the mobile electronic devices being designated as one of a master agent 602, producer agent 604, or consumer agent 606*a-f* depending on the functionality being provided by the mobile electronic device in implementing the method. Each of the plurality of mobile electronic devices may be any suitable type of such mobile electronic device, such as a smart phone, a tablet computer, and so on. The method utilizes one master agent 602, one producer agent 604, which may be the same mobile electronic device as the master agent, and a plurality of consumer agents 606*a-f* that collectively form the mosaic screen 600. Each of the plurality of consumer agents 606*a-f* displays a portion of the overall mosaic screen 600, with the portion of the overall mosaic screen displayed by a particular consumer agent being referred to as a sub-screen or sub-mosaic in the following description. Each of the master agent 602, producer agent 603 and consumer agents 606 may be considered to be the corresponding mobile electronic device having the corresponding functionality, or the corresponding circuitry, which may include hardware, software, firmware, or any combination thereof, of the mobile electronic device.

The dashed lines 608 in FIG. 6 represent communications among the master agent 602, producer agent 604, and consumer agents 606*a-f* during a setup process portion of the method, while solid lines 610 represent communication between the producer agent and the consumer agents during a producer content distribution process portion of the method, as will be described in more detail below. The agents 602, 604, 606 communicate with each other over a suitable wireless network, such as a Wi-Fi network, and utilized suitable protocols to implement the setup process as well as the producer content distribution process portion of the method.

In the example of FIG. 6, the mosaic screen 600 is formed by the six consumer agents 606*a-f* arranged in three rows and to columns as illustrated in the figure. This number and arrangement of consumer agents 606*a-f* is merely by way of example to provide an understanding of general embodiments of the present disclosure. Embodiments including fewer or additional consumer agents 606 arranged in alternative ways to form the mosaic screen 600 will be understood by those skilled in the art in view of the teachings and definitions provided in the present description, and are accordingly such embodiments are within the scope of the present disclosure although not expressly described herein. In addition, note that in the present description the reference "606" is used when referring generally to any or all of the consumer agents 606*a-f*, while the both the number and letter designation (e.g., 606*d*) will be utilized when referring to a specific one of the consumer agents.

The master agent 602 manages the overall operation of a session that is created to display content provided by the producer agent 604 on the mosaic screen 600 formed by the plurality of consumer agents 606*a-f*, including the establishment or start of the session through the termination of the session. Initially, the master agent 602 implements the setup process portion of the method as mentioned above, with this setup process portion being referred to simply as the setup process or sub process in the following description. During the setup process, the master agent 602 identifies or detects the producer agent 604 containing the content that is to be displayed on the mosaic screen 600 and also identifies or detects consumer agents 606 proximate the master and producer agents that may accordingly be selected for providing the mosaic screen. This is part of a mosaic composition algorithm executed by the master agent 602 that gathers information about the content of the producer agent 604 that is to be displayed on the mosaic screen 600 along with information about screen sizes, resolutions, display rate (e.g., frames per second), and so on for each of the consumer agents 606.

Utilizing the information gathered from the proximate consumer agents 600 and the information about the content from the producer agent 604, the master agent 602 executes the mosaic composition algorithm to select consumer agents to provide the mosaic screen and notifies any proximate consumer agents that are not selected, leaving these non-selected consumer agents available to participate in the formation of another mosaic screen being provided by another master agent proximate that consumer agent. Each consumer agent 606 may only participate in a single session with a corresponding master agent 602. The mosaic composition algorithm also determines the arrangement or relative positioning of the consumer agents 606 selected to form the mosaic screen 600 along with the sub-mosaic or portion of the overall image being displayed on the mosaic screen that is to be displayed on each consumer agent, and communicates this information to each consumer agent. As mentioned above, the master agent 602 manages the session created to display content on the mosaic screen 600 including the termination of the session after the desired content provided by the producer agent 604 has been viewed, or for other reasons, as will be described in more detail below.

As discussed above, the producer agent 604 communicates information about the content to be displayed on the mosaic screen 600 with the master agent 602 during the setup process. This content may correspond to a single image such as a photograph, a stream of images of a video to be displayed on the mosaic screen 600, or an image corresponding to the content that is being displayed on the screen or display of the master agent 602 such that the mosaic screen mirrors the display of the master agent. Once the master agent 602 has setup the session, the producer agent 604 manages the distribution of the content being provided by the producer agent that is to be displayed on the mosaic screen 600. This content distribution includes establishing communication channels between the producer agent 604 and each of the consumer agents 606*a-f* along with defining the protocol to be utilized in sending frames of the content to the consumer agents and associated content distribution or frame-buffer parameters to be utilized by each of the consumer agents to display the proper portion or sub-mosaic of the overall image being displayed by the mosaic screen 600. The producer agent 604 may also implement a synchronization protocol that is utilized by the consumer agents 606*a-f* to synchronize the sub-mosaics of the overall image being provided by the plurality of consumer agents to avoid or at least minimize jitter affects in the overall image being displayed on the mosaic screen 600 that would occur if the display of all the portions or sub-mosaics of the overall image are not synchronized. Where the content being provided by the producer agent 604 includes audio data, each of the plurality of consumer agents may play this audio portion of the content. Alternatively, the master agent 602 or producer agent 604 may select a subset of all the consumer agents 606 to play the audio data while all consumer agents function to display the corresponding portion of the visual data of the content.

Each of the consumer agents 606 operates in combination with the master agent 602 and producer agent 604 to provide a corresponding of portion of the mosaic screen 600. More specifically, each consumer agent 606 communicates over the associated wireless network to make its presence known. This enables the master agent 602 to detect consumer agents 606 proximate the master agent during the setup process. The consumer agent 606 provides the master agent 606 with information about the consumer agent that the master agent then utilizes in selecting consumer agents and in arranging the consumer agents to form the mosaic screen 600. The "arrangement" of the consumer agents 606 refers to the location of each consumer agent in the mosaic screen 600 to best display the desired images on the mosaic screen given the characteristics of all the selected consumer agents, as will be described in more detail below. Each consumer agent 606 receives from the master agent 602 an indication of whether the consumer agent has been selected or not, and, if selected, receives parameters defining the operation of the consumer agent in forming the mosaic screen 600. These parameters received from the master agent 602 by each consumer agent 606 include the portion of the frame-buffer or image to be displayed on the mosaic screen 600 so that the consumer agent, upon receiving the frame-buffer or image to be displayed from the producer agent, can display the proper portion of that image for purposes of forming the mosaic screen 600, as will be described in more detail below.

As mentioned above, the type of content provided by the producer agent 604 may be a single image, a video, or a mirroring of the screen of the master agent 602. During the setup process, the master agent 602 utilizes the type of content in selecting and defining the arrangement of the consumer agents 606 to form the mosaic screen 600. The type of the content to be provided may be defined by different content parameters, including the resolution and frame rate (e.g., frames per second) of the content. The master agent 602 communicates with the producer agent 604 and consumer agents 606 over a suitable wireless network, such as a Wi-Fi network as previously mentioned, and utilizes these content parameters relating to the type of content to be displayed in combination with display parameters received from the consumer agents to form or configure the mosaic screen 600. The display parameters the master agent 602 receives from the consumer agents 606 relate to specifications of the consumer agent for displaying visual content, such as the frame rate of the consumer agent, screen size of the consumer agent, resolution, pixel format of the consumer agent such as color depth and color space (RGB, YPbPr, YCbCr, etc.), and any other such pertinent parameters. This communication of parameters between the master agent 602 and the producer agent 604 and consumer agents 606 over the wireless network may be done using suitable existing data exchange protocols such as JavaScript Object Notation (JSON) or Google's Protocol Buffers, as will be appreciated by those skilled in the art.

Figure 7A:
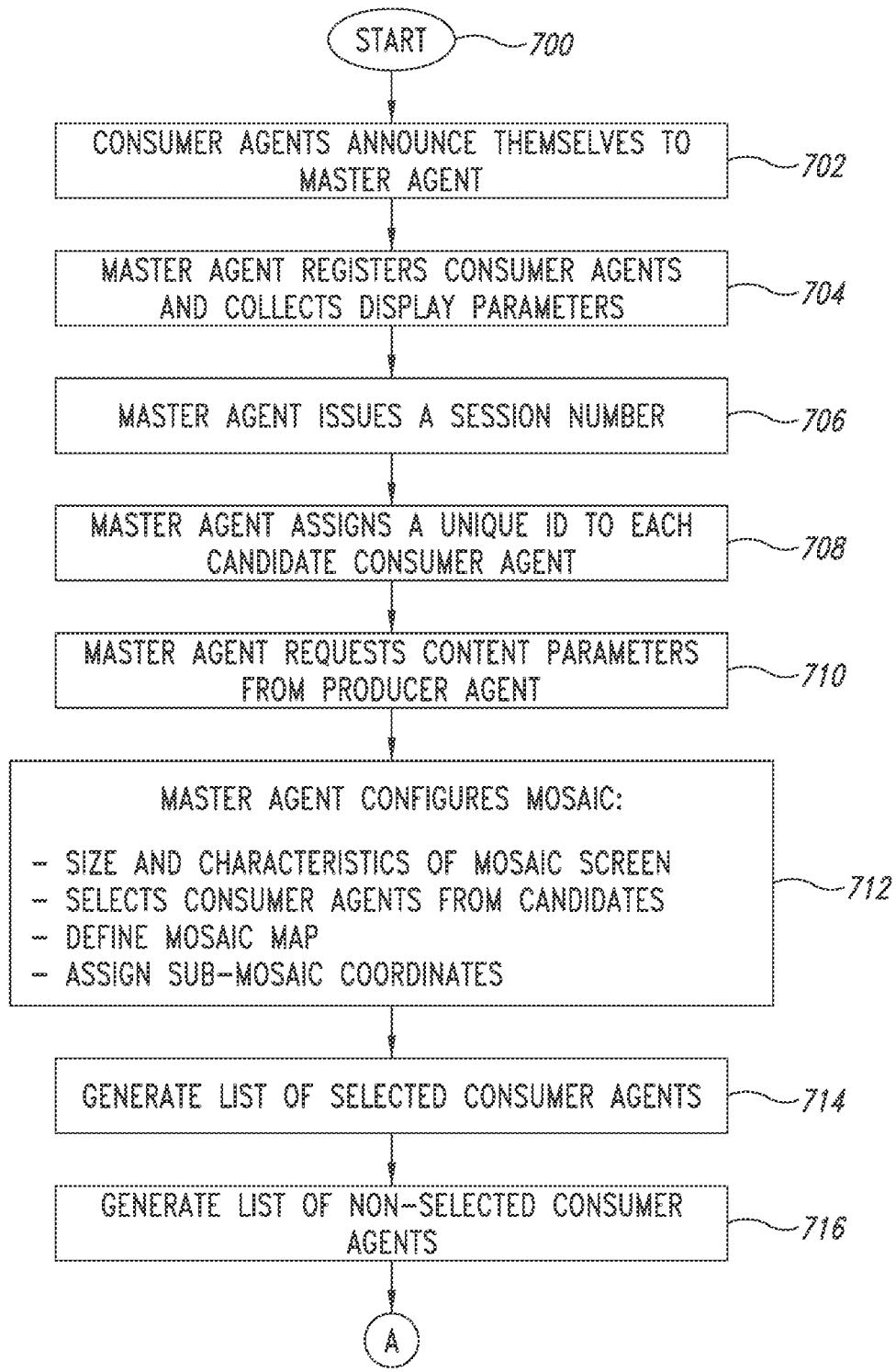
FIGS. 7A and 7B are a flowchart illustrating in more detail the set up and producer content distribution processes implemented by the master and producer agents of FIG. 6 according to one embodiment of the present disclosure.
Figure 7B:
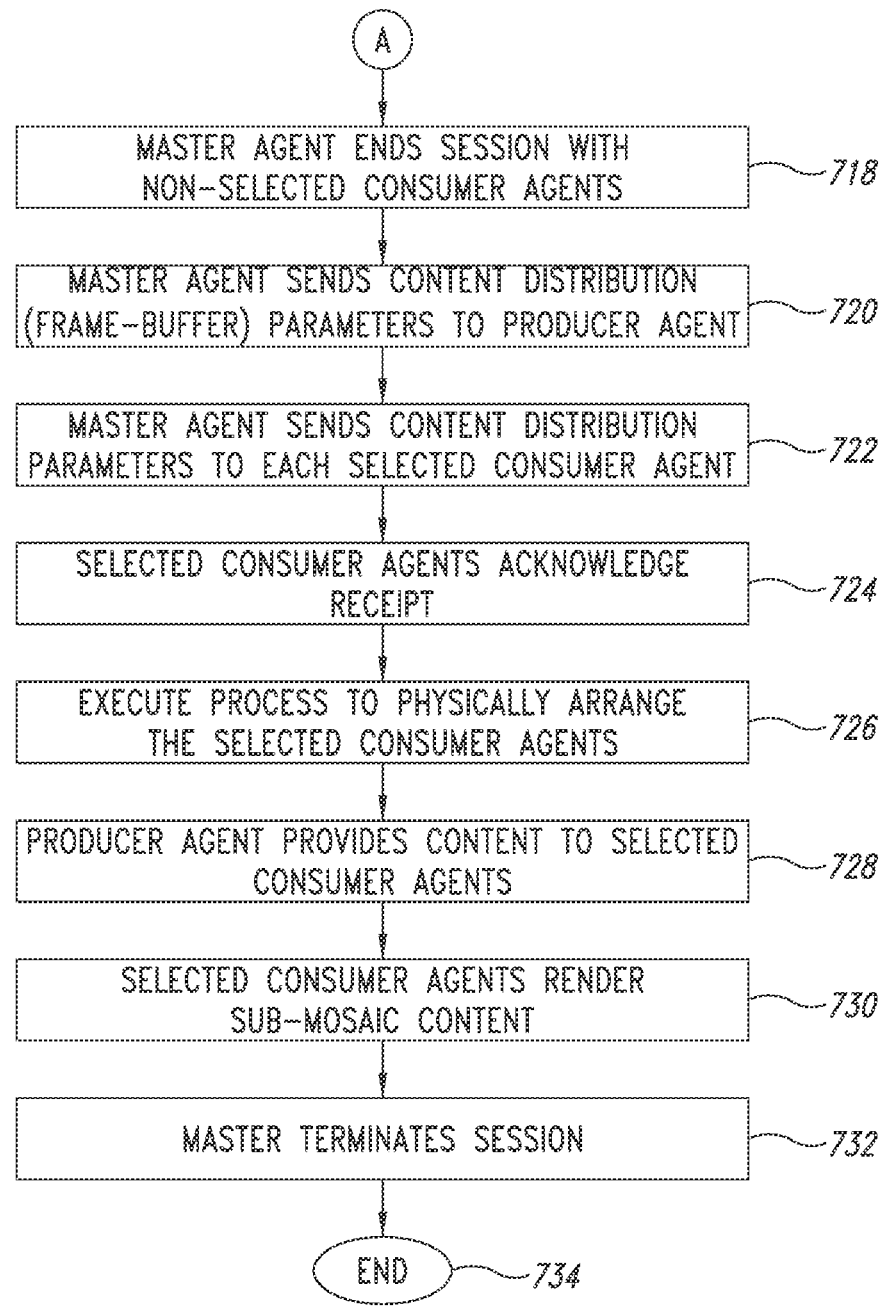

FIGS. 7A and 7B are a flowchart illustrating in more detail the setup and producer content distribution processes implemented by the master agent 602 and producer agent 604 of FIG. 6 according to one embodiment of the present disclosure. In the FIG. 7A, the process starts in step 700 and proceeds to step 702 in which each of the consumer agents 606 announces it is coupled to the wireless network to which the master agent 602 and producer agent 604 are also coupled. This "announcement" by each consumer agent 606 indicates that the consumer agent is coupled to or present on the wireless network and available to be utilized in a session to form the mosaic screen 600 (FIG. 6). The announcement provided by each candidate consumer agent 606 also includes consumer agent display parameters that provide specifications for the screen or display of the consumer agent. Each consumer agent 606 provides the corresponding announcement over the wireless network to the master agent 602 in the form of a suitable packet that is transmitted over the wireless network and received by the master agent 602 in this embodiment. In other embodiments the consumer agents 606 coupled to the wireless network could first listen for a transmission request from the master agent 602 requesting available consumer agents to respond, and thereafter in response to receiving such a transmission request announce their presence.

From step 702 the process proceeds to step 704 and the master agent 602 creates a registry of all the available consumer agents 606 that have announced that they are present on the wireless network and available for a session to form the mosaic screen 600. These available consumer agents 606 may be referred to as candidate consumer agents in the present description. As part of this registration of candidate consumer agents 606, the master agent 602 also receives from each candidate consumer agent display parameters that provide specifications for the screen or display of the consumer agent. The master agent 602 also stores these display parameters of each candidate consumer agent 606 in the registry, where the display parameters include the frame rate of the consumer agent, screen size of the consumer agent, and pixel format of the consumer agent such as color depth and color space as previously mentioned. After having created the registry in step 704, the process proceeds to step 706.

In step 706, the master agent 602, in response to receiving announcements from candidate consumer agents 606 and generating the registry in step 704, generates or issues a session number for the session that is being configured to form the mosaic screen 600. The process then proceeds to step 708 and the master agent 602 assigns a unique identifier (ID) to each of the candidate consumer agents 606 in the registry. From step 708 the process then proceeds to step 710 and the master agent 602 communicates with the producer agent 604 (FIG. 6) to obtain content parameters for the content to be provided by the producer agent 604 and displayed on the mosaic screen 600. These content parameters include parameters defining the characteristics of the content to be provided by the consumer agent 604 such as the resolution and frame rate of the content to be provided as previously mentioned. Where the producer agent 604 is on a mobile electronic device that is separate from the master agent 602, step 710 includes identifying the producer agent and communicating with the producer agent to obtain the content parameters.

Once the master agent 602 has obtained the content parameters from the producer agent 604 in step 710, the process proceeds to step 712 and the master agent executes the mosaic composition algorithm to configure the mosaic screen 600 and to determine content distribution or framebuffer parameters that control the display of the content provided by the producer agent 604 on the plurality of consumer agents 606 to form the mosaic screen. In configuring the mosaic screen 600, the master agent 602 determines an overall screen size in terms of pixels and characteristics for the mosaic screen 600. The master agent 602 also executes a process for selecting and excluding consumer agents 606 from among the candidate consumer agents in the registry. The specifics of this process may vary but as part of the process the master agent 602 utilizes display parameters of the candidate consumer agents 606 stored in the registry to select ones of these candidate consumer agents for inclusion in the session to provide the mosaic screen 600. Recall, these display parameters would typically include a screen size, resolution, frame rate and a pixel format for the screen of the consumer agent 606. The master agent 602 may select candidate consumer agents 606 in the registry based on screen sizes, resolution, frame rates, color depths and color spaces for the consumer agents in the registry, and conversely may exclude consumer agents from the session based on these same parameters. For example, if one or several of the consumer agents have a different frame rate or color space than most of the others consumer agents in the registry, the master agent 602 may exclude such one or several consumer agents from utilization in the session forming the mosaic screen 600. The master agent 602 also utilizes the display parameters of the consumer agents 606 to determine the sub-mosaic of each consumer agent, where the sub-mosaic is the portion of the overall image displayed on the mosaic screen 600 that is displayed by the consumer agent. In sum, in step 712 the master agent 602 executes the mosaic composition algorithm to configure the mosaic screen 600 by determining the size and characteristics of the mosaic screen 600 to be provided, selecting consumer agents 606 from among the candidate consumer agents in the registry, defining a mosaic map indicating the portion of the overall image each selected consumer agent will display (i.e., the sub-mosaic to be displayed), and assigning sub-mosaic coordinates to each selected consumer agent that define the physical position of the consumer agent within mosaic screen formed by all the selected consumer agents.

From step 712 the process proceeds to step 714 and generates a list of the included or selected consumer agents 606 and then proceeds to step 716 and generates a list of the excluded or non-selected consumer agents. From step 716 the process proceeds to step 718 and the master agent 602 terminates the current session with the non-selected consumer agent 606. These non-selected consumer agents 606, after termination of the current session with the master agent 602 in step 718, are then available to participate in other sessions with other master agents coupled to the wireless network. After step 718, the process then proceeds to step 720 and the master agent 602 sends the content distribution or frame-buffer parameters calculated by the mosaic composition algorithm to the producer agent 604. The producer agent 604 will thereafter utilize these content distribution or frame-buffer parameters in distributing content to the selected consumer agents 606 to form the mosaic screen 600. More specifically, the producer agent 604 will, based on the frame-buffer parameters, encode the content to be displayed on the mosaic screen 600 as necessary for proper display of portions of this content by each of the selected consumer agents 606.

After step 720, the process proceeds to step 722 and the master agent 602 sends content distribution parameters including the sub-mosaic coordinates to each selected consumer agent 606. These content distribution parameters identify for each selected consumer agent 606 the portion of the overall image displayed on the mosaic screen 600 that the consumer agent will display. The content distribution parameters for each selected consumer agent 606 will be described in more detail below with reference to FIG. 8. The process then proceeds to step 724 and each selected consumer agent 606 acknowledges receipt of the content distribution parameters from the master agent 602, indicating the consumer agent is ready to begin displaying the proper portion of the content received from the producer agent 604.

From step 724, the process proceeds to step 726 and a process is executed to physically arrange the selected consumer agents 606 to form the mosaic screen 600 of FIG. 6. This physical arrangement will of course depend upon the number of candidate consumer agents 606 in the registry (step 704) and the characteristics of these candidate consumer agents. In the example of FIG. 6, the master agent 602 selects six consumer agents 606*a-f* to form the mosaic screen 600. Each of the selected consumer agent 606*a-f* must be physically positioned relative to the other selected consumer agents so that when each consumer agent displays the corresponding content the proper overall image of the mosaic screen 600 is formed. As mentioned above, sub-mosaic coordinates calculated by the master agent 602 for each selected consumer agent 606*a-f* identify for each selected consumer agent 606 the portion of the overall image displayed on the mosaic screen 600 that the consumer agent will display and also indicate the relative physical position of the consumer agent relative to the other selected consumer agents forming the mosaic screen.

These sub-mosaic coordinates of each selected consumer agent 606 are also utilized in the process executed in step 726 in which the selected consumer agents are physically arranged next to each other to form the mosaic screen 600. The precise manner in which this is done in step 726 varies in different embodiments of the present disclosure but will be accomplished with the assistance of one or more users of the agents 602-606. For example, in one embodiment, upon receipt of the sub-mosaic coordinates from the master agent 602 in step 722 each selected consumer agent 606 provides a visual indicator on the screen of that consumer agent indicating the proper location of the consumer agent within the mosaic screen 600. Instructions for owners or users of the consumer agents 606 could also be displayed on the screen of each consumer agent telling the users how to arrange the consumer agents to form the mosaic screen. The visual indicators on the screens of the consumer agents 606 could simply be numbers 1-6 in the example of FIG. 6, with instructions also being provided on the screen of each consumer agent to arrange the consumer agents displaying 1-6 sequentially in three rows of consumer agents with two consumer agents per row and with the number 1 being in the lower left-hand corner and the number 6 being in the upper right-hand corner of the mosaic screen 600. Alternatively, each of the consumer agents 606 could display a portion of a configuration image, with the users of the consumer agents then properly arranging the consumer agents so that the configuration image is properly displayed on the mosaic screen 600 and in this way properly positioning each of the consumer agents within the mosaic screen. Other processes are executed in step 726 in other embodiments of the present disclosure to properly configure the consumer agents 606 by physically arranging the consumer agents relative to one another to properly form the mosaic screen 600.

After the selected consumer agents 606 have been properly positioned or arranged to form the mosaic screen 600 in step 726, the process proceeds to step 728 in the producer agent 604 provides content to the selected consumer agent 606. In step 728, the producer agent 604 manages the streaming transmission of the content to be displayed on the mosaic screen 600 over the wireless network to each of the selected consumer agents 606. This includes establishing a communication channel using a suitable protocol over the wireless network to communicate the content to the selected consumer agent 606. In embodiments of the present disclosure, the producer agent 604 utilizes a suitable media server streaming protocol such as real-time streaming protocol (RTSP) or real-time transport protocol (RTP) and RTP control protocol (RTCP) to stream the content to be displayed on the mosaic screen 600 to the consumer agents 606. As mentioned above, the producer agent 604 also encodes the streamed content as necessary for proper display on each of the selected consumer agent 606, with this encoding being determined as part of the mosaic composition algorithm executed by the master agent 602 in step 712. This encoding by the producer agent 604 also manages changes in size and shape between the original content being provided and the mosaic screen 600 to maintain shape proportions between the source content being provided by the producer agent and the display of that content on the mosaic screen 600. In streaming other otherwise providing the content over the wireless network to the consumer agents 606 includes providing audio data where the content is a video, for example.

After step 728, the process proceeds to step 730 and the selected consumer agents 606 receiving the content being streamed or otherwise provided by the producer agent 604 collectively render that received content to thereby provide the desired image or images on the mosaic screen 600. In one embodiment, each consumer agent 606 includes a media server client that receives full or overall images to be displayed on the mosaic screen 600 from the producer agent 604 and which thereafter renders, based on the sub-mosaic coordinates of the consumer agent, the proper portion of the overall image assigned to that consumer agent. Once the desired content provided by the producer agent 604 has been rendered on the mosaic screen 600, the process proceeds to step 732 and the master agent 602 communicates with the producer agent and consumer agents to terminate the session. This determination in step 732 may involve each of the selected consumer agent 606 providing some sort of visual indicator on the display of the consumer agent indicating to the users of the selected consumer agents forming the mosaic screen 600 that the session has been terminated and signaling to each such user that he or she should retrieve their consumer agent. From step 732 the process goes to step 734 and terminates.

Figure 8:
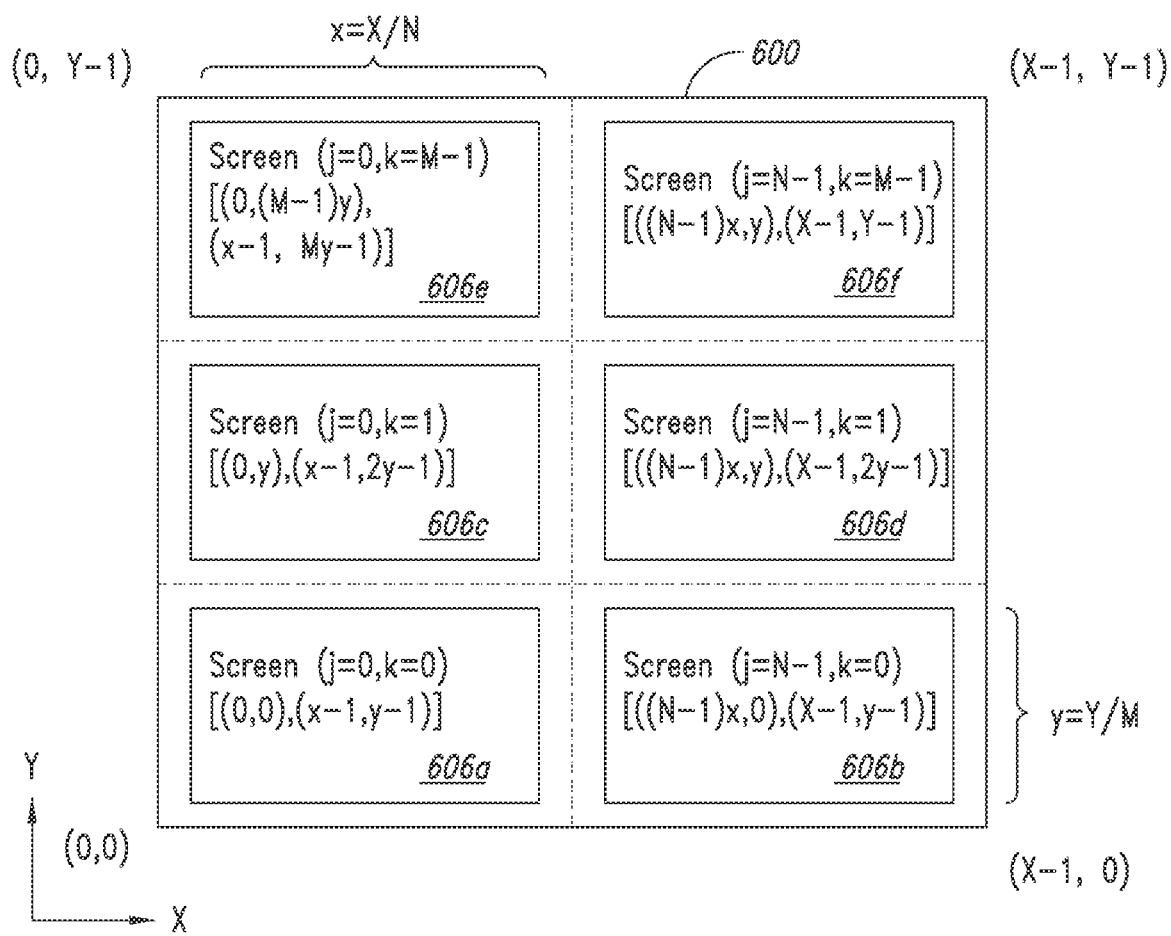
FIG. 8 is a diagram illustrating the configuration or arrangement at the pixel-level of the pixels of the mosaic screen formed by the plurality of consumer agents in FIG. 6.

FIG. 8 is a diagram illustrating the configuration or arrangement at the pixel-level of the pixels of the mosaic screen 600 formed by the plurality of consumer agents 606a-f in FIG. 6. The consumer agents 606a-f may alternatively referred to as sub-mosaics or sub-mosaic screens 606a-f in the following discussion to simply the description of FIG. 8. The mosaic screen 600 is formed by M×N sub-mosaic screens, where M is the number of rows of sub-mosaic screens in the mosaic screen and N is the number of columns. Thus, in the example of FIG. 8, M=3 and N=2. The mosaic screen 600 includes K total screens, where K=M×N. As discussed above, the screen size of the mosaic screen 600 in terms of pixels is calculated by the master agent 602. In the example of FIG. 8, the mosaic screen 600 size is X pixels times Y pixels, where the X pixels are along a horizontal direction parallel to an X-axis in the figure and the Y pixels are along a vertical direction parallel to a Y-axis. The mosaic screen is X×Y pixels with the pixel in the lower left corner of the screen designated as pixel (0,0). Thus, the pixel in the upper left corner of the screen is pixel (0,Y−1), the pixel in the lower right corner of the screen is pixel (X−1,0), and the pixel in the upper right corner of the mosaic screen is pixel (X−1,Y−1), as seen for all these pixels in FIG. 8. Thus, the mosaic screen 600 includes pixels 0−(X−1) along the horizontal direction of the screen and pixels 0−(Y−1) along the vertical direction of the screen.

The screen of each sub-mosaic or consumer agent 606a-f is identified by sub-mosaic position coordinates (j, k) which indicate the location of the consumer agent in the mosaic screen 600 relative to the other consumer agents. The sub-mosaic position coordinate j varies from 0−(N−1) and the sub-mosaic position coordinate k varies from 0−(M−1). The sub-mosaic position coordinate j indicates the column in the M×N mosaic screen 600 in which a given consumer agent 606 is positioned while the sub-mosaic position coordinate k indicates the row in the M×N mosaic screen in which the consumer agent is positioned. In the example of FIG. 8 where M=3 and N=2, j varies from 0-1 and k varies from 0-2. The consumer agent 606a is identified by sub-mosaic position coordinates (0,0) and is in the lower left of the mosaic screen 600. The consumer agent 606b is identified by sub-mosaic position coordinates (N−1,0), which is (1,0) in the example of FIG. 8 since N=2. Similarly, the sub-mosaic position coordinates of the remaining consumer agents 606c-f are illustrated in FIG. 8, with consumer agent 606f being positioned in the upper right of the mosaic screen 600 an identified through sub-mosaic position coordinates (N−1,M−1).

The pixels associated with each of the consumer agents 606a-f will now be described in more detail. In the example of FIG. 8, the sub-mosaic screens of the consumer agents 606a-f are assumed to all be the same size. This sub-mosaic screen size is defined by sub-mosaic screen coordinates (x, y), where x=X/N and y=Y/M. FIG. 8 illustrates adjacent to consumer agent 606b the vertical height y=Y/M of the sub-mosaic screens and adjacent to the consumer agent 606e the horizontal width x=X/N of the sub-mosaic screens. Each of the sub-mosaic screens is identified by its sub-mosaic position coordinates (j, k) in the mosaic screen 600 and by the sub-mosaic screen coordinates of the sub-mosaic screen. More specifically, the sub-mosaic scree coordinates of each sub-mosaic screen 606a-f identify the pixels in opposite corners (lower left and upper right) of the sub-mosaic screen. The formula for these sub-mosaic screen coordinates for each sub-mosaic screen 606a-f is given by the following general formula:

$$[(x*j, y*k), (x*(j+1)-1, y*(k+1)-1)] \quad (Eqn.\ 1)$$

These sub-mosaic position coordinates (j, k) and sub-mosaic screen coordinates identify each sub-mosaic screen 606a-f in the mosaic screen 600. For example, as seen in FIG. 8, sub-mosaic screen 606a is identified by sub-mosaic position coordinates (j=0, k=0) and by sub-mosaic screen coordinates [(0,0), (x−1,y−1)] as given by Eqn. 1. Each sub-mosaic screen 606a-f is x times y pixels and thus for the sub-mosaic screen 606a with its lower left pixel designated at pixel (0, 0), the pixel in the upper right corner is at (x−1, y−1) to define the sub-mosaic screen coordinates [(0,0), (x−1, y−1)]. Similarly for the sub-mosaic screen 606b, the sub-mosaic screen 606b is identified by sub-mosaic position coordinates (j=1, k=0) while the pixel in the lower left is pixel (x,0) and the pixel in the upper right is pixel (X−1, y−1). Thus, the sub-mosaic screen coordinates for sub-mosaic screen 606b are [(x,0), (X−1, y−1) since N=2 and thus (N−1)x shown in FIG. 8 becomes x. Each of the consumer agents 606a-f receives the overall image to be displayed on the mosaic screen 600 from the producer agent 604, and then utilizes these sub-mosaic position and screen coordinates to render the proper portion of this overall image so that the consumer agents 606a-f collectively render the overall image. The sub-mosaic position coordinates (j, k)

and sub-mosaic screen coordinates as given by (Eqn. 1) for each consumer agent 606 (FIG. 6) correspond to the content distribution or frame-buffer parameters for that consumer agent. Each consumer agent 606 utilizes these content distribution or frame-buffer parameters to render the proper portion of the overall image being rendered on the mosaic screen 600.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising, comprising:
   a processor; and
   a storage device electrically coupled to the processor, the storage device storing executable instructions, which when executed by the processor enable the processor to implement acts including:
   determining that a master agent and a consumer agent are both in a stable position based on motion sensor measurements of the master agent and the consumer agent;
   determining a first tap point on the master agent that is proximate to the consumer agent based on one or more of a first motion sensor measurement or a first audio sensor measurement of the master agent;
   determining a second tap point on the consumer agent that is proximate to the master agent based on one or more of a second motion sensor measurement or a second audio sensor measurement of the consumer agent;
   receiving at the master agent an announcement from the consumer agent indicating the presence of the consumer agent, the announcement including a display parameters for a display of the consumer agent, the display parameter including orientation of the display of the consumer agent with respect to a display of the master agent;
   receiving at the master agent a content parameter from a producer agent, the content parameter including a characteristic of a content to be displayed by the consumer agent;
   configuring a mosaic screen based on the received announcement and the content parameter, the configuring including generating a content distribution parameter based on the content parameter and the display parameter of the consumer agent; and
   providing the generated content distribution parameter to the consumer agent.

2. The system of claim 1 wherein the acts include:
   encoding the content to be displayed by the consumer agent based on the content distribution parameter; and
   providing the content to the consumer agent for displaying on the display of the consumer agent to form the mosaic screen.

3. The system of claim 2 wherein the acts include causing to physically arrange the consumer agent with respect to the master agent to form the mosaic screen.

4. The system of claim 1 wherein the display parameter includes a frame rate, a screen size, a resolution and a pixel format of the display of the consumer agent.

5. The system of claim 4 wherein the pixel format includes a color depth and color space of pixels of the display of the consumer agent.

6. The system of claim 1 wherein the content parameter includes a resolution and a frame rate of the content to be displayed by the consumer agent.

7. The system of claim 1 wherein the content distribution parameter includes sub-mosaic position coordinates indicating a location of the consumer agent in the mosaic screen and include sub-mosaic screen coordinates indicating a portion of an overall image that is to be displayed on the display of the consumer agent as a part of the mosaic screen.

8. The system of claim 1 wherein the system is located in one or more of the master agent or the consumer agent.

9. The system of claim 8 wherein the system is distributed in the master agent and the consumer agent.

10. A system, comprising:
    a processor; and
    a storage device electrically coupled to the processor, the storage device storing executable instructions, which when executed by the processor enable the processor to implement acts including:
    create display content by a producer agent on a mosaic screen on a plurality of consumer agents;
    implement a setup process with a master agent, the setup process includes further acts including:
      identify the producer agent that includes the content to be displayed on the mosaic screen;
      identify the plurality of consumer agents proximate the master agent and the producer agent;
      determining a first tap location on a first consumer agent of the plurality of consumer agents based on one or more of a first motion sensor measurement or a first audio sensor measurement of the first consumer agent;
      determining a second tap point on a second consumer agent of the plurality of consumer agents based on one or more of a second motion sensor measurement or a second audio sensor measurement of the second consumer agent, the first consumer agent being adjacent to the second consumer agent; and
      gather information about display parameters of each of the plurality of consumer agents to receive the content to be displayed on the mosaic screen;
      arrange display of the content on the mosaic screen based on the first tap location and the second tap location, wherein the producer agent is part of a first mobile electronic device with a display, wherein the display of the first mobile electronic device does not participate in the mosaic screen.

11. The system of claim 10 wherein the information including at least screen size, resolution, and frames per second.

12. The system of claim 10 wherein the storage device storing executable instructions, which when executed by the processor enable the processor to implement acts including:

select consumer agents to receive the content for the mosaic screen; and notify any proximate consumer agents that are not selected.

13. The system of claim 12 wherein the storage device storing executable instructions, which when executed by the processor enable the processor to implement acts including:

determines a relative positioning of the selected consumer agents; and transmit positioning information of the content to each selected consumer agent.

14. A method, comprising:

executing by a processor executable instructions stored in a storage device electrically coupled to the processor, the executing including:

outputting display content from a producer agent to a mosaic screen on a plurality of consumer agents;

implementing a setup process with a master agent, the setup process includes:

identifying the producer agent that includes the content to be displayed on the mosaic screen;

identifying the plurality of consumer agents proximate the master agent and the producer agent;

determining a first tap location on a first consumer agent of the plurality of consumer agents based on one or more of a first motion sensor measurement or a first audio sensor measurement of the first consumer agent;

determining a second tap point on a second consumer agent of the plurality of consumer agents based on one or more of a second motion sensor measurement or a second audio sensor measurement of the second consumer agent, the first consumer agent being adjacent to the second consumer agent; and gathering information about display parameters of each of the plurality of consumer agents to receive the content to be displayed on the mosaic screen; and arrange display of the content on the mosaic screen based on the first tap location and the second tap location, wherein the producer agent is part of a mobile electronic device with a display, wherein the display of the mobile electronic device does not participate in the mosaic screen.

15. The method of claim 14 wherein the information including at least screen size, resolution, and frames per second.

16. The method of claim 14 comprising:

selecting consumer agents to receive the content for the mosaic screen; and notifying any proximate consumer agents that are not selected.

17. The method of claim 16 comprising:

determining a relative positioning of the selected consumer agents; and transmitting positioning information of the content to each selected consumer agent.

* * * * *

UNITED STATES PATENT AND TRADEMARK OFFICE
CERTIFICATE OF CORRECTION

| | | |
|---|---|---|
| PATENT NO. | : 12,223,218 B2 | Page 1 of 1 |
| APPLICATION NO. | : 18/063028 | |
| DATED | : February 11, 2025 | |
| INVENTOR(S) | : Benedetto Vigna et al. | |

It is certified that error appears in the above-identified patent and that said Letters Patent is hereby corrected as shown below:

In the Claims

<u>Column 15, Claim 1, Line 29:</u>
"A system comprising, comprising:" should read: -- A system, comprising: --

Signed and Sealed this
Fifteenth Day of April, 2025

Coke Morgan Stewart
*Acting Director of the United States Patent and Trademark Office*